US006672272B2

(12) United States Patent
McGloin

(10) Patent No.: US 6,672,272 B2
(45) Date of Patent: Jan. 6, 2004

(54) CYLINDER HEAD COVER ASSEMBLY HAVING ELECTRICAL CONNECTION

(75) Inventor: Jonathan McGloin, Peterborough (GB)

(73) Assignee: Perkins Engines Co Ltd, Peterborough ( * ) Notice: Subject to any disclaimer, the term of this patent is extended or adjusted under 35 U.S.C. 154(b) by 0 days.

(21) Appl. No.: 10/262,736

(22) Filed: Oct. 2, 2002

(65) Prior Publication Data

US 2003/0089328 A1 May 15, 2003

(30) Foreign Application Priority Data

Nov. 13, 2001 (EP) ........................................... 01309554

(51) Int. Cl.[7] ......................... F02B 77/00; F02M 51/00; H02G 3/00

(52) U.S. Cl. ............................. 123/195 C; 123/195 E; 123/198 E; 123/472

(58) Field of Search ............................ 123/472, 195 C, 123/195 E, 198 E, 90.38; 29/888.01, 888.011, 278

(56) References Cited

U.S. PATENT DOCUMENTS 4,922,880 A * 5/1990 Seibt et al. ................. 123/509
5,568,794 A * 10/1996 Tabuchi et al. ......... 123/195 E
5,582,084 A * 12/1996 Sarmiento .................... 81/345
5,642,704 A * 7/1997 Gogots et al. .......... 123/198 R
5,771,850 A * 6/1998 Okada .................... 123/143 C
5,890,475 A * 4/1999 Dallman ..................... 123/573
6,240,903 B1 * 6/2001 Kurozumi ................... 123/472

FOREIGN PATENT DOCUMENTS

EP 0 454 895 A2 * 11/1991 ........... H01R/13/52

OTHER PUBLICATIONS

Excerpts from Caterpillar Inc. drawing No. 161–4334 showing prior art engine design.
Excerpts from Caterpillar Inc. drawing No. 117–2760 showing prior art engine design.

* cited by examiner

*Primary Examiner*—Tony M. Argenbright
(74) *Attorney, Agent, or Firm*—John J Cheek

(57) ABSTRACT

Modern internal combustion engines require the provision of an electrical connection to electrically controlled devices disposed within a cylinder head cover. Prior mechanisms for providing such electrical connections have been complex and awkward to assembly while maintaining the desired sealing characteristics and, in many instances, have not provided a ready way to remove the cylinder head cover without breaking the electrical connection to the electrically controlled devices. To address these deficiencies, a readily usable and fluid-tight connection arrangement and path through the cylinder head cover can be provided by way of a first connector that is moveable by a suitable tool to engage the internal surface of the head cover adjacent an aperture in the head cover. A second connector can be mated with the first connector from the exterior and engages the exterior of the head cover.

21 Claims, 5 Drawing Sheets

CYLINDER HEAD COVER ASSEMBLY HAVING ELECTRICAL CONNECTION

TECHNICAL FIELD

This invention relates to the provision of electrical connections associated with cylinder head cover assemblies for use with internal combustion engines having electrical equipment, such as electrically-controlled fuel injectors, in the cylinder head.

BACKGROUND

There is a general trend towards the use of electrically-controlled fuel injectors in diesel engines, prompted by the continuing drive for lower emissions.

Since the fuel injectors are conventionally positioned on the cylinder head within a cylinder head cover (rocker cover), it is therefore necessary to route electrical wiring from the individual fuel injectors past the cylinder head cover to an external control circuit. The volume enclosed by the cylinder head cover contains lubricating oil paths for camshaft and valve components, and also a breather assembly for gas recirculation. It is therefore necessary for the cylinder head cover to be attached to the cylinder head in a fluid-tight manner.

It is known to route the electrical wiring for the fuel injectors through an aperture in the cylinder head cover. This requires an aperture which is larger than any connector at one or other end of the wiring, and such an aperture is difficult to seal. It is also known to route the wiring through a grommet inserted in a recess extending from one edge of the cylinder head cover. This is awkward to assemble, and is difficult to implement in such a way as to establish and maintain a fluid-tight seal.

The present invention provides a cylinder head cover assembly which provides a route for electrical connections which is simple to assemble and has effective sealing.

SUMMARY OF THE INVENTION

The present invention provides a cylinder head cover assembly for use with an internal combustion engine. The assembly comprises a cylinder head cover attachable to a cylinder head to define a closed space.

A first connector has electrical wiring extending therefrom which has at least one distal end connectable, in use of the engine, to at least one electrical device disposed within said closed space.

The cylinder head cover defines an aperture therethrough with a closed periphery, in which aperture said first connector is receivable to be removably seated against the internal surface of the cylinder head cover adjacent said closed periphery.

From another aspect, the invention provides a method of connecting at least one electrical device disposed within a cylinder cover to a location external to the cylinder cover. In the method a connector which is coupled via electrical wiring to a first connector is attached to the at least one electrical device. The first connector is engaged against an aperture provided in the cylinder head cover with the first connector removably seated against the internal surface of the cylinder head cover adjacent the aperture.

A second connector is then inserted into the aperture from the exterior of the cylinder head cover to engage and electrically couple with the first connector.

From yet another aspect, the invention provides a method of removing a cylinder head cover from a cylinder head, in which cylinder head cover there is disposed at least one electrical device attached to electrical wiring, the wiring being coupled to a first connector, the method comprising disengaging and removing a second connector from the first connector through an aperture provided in the cylinder head cover, thereby electrically decoupling the first and second connectors.

The first connector is then caused to move away from the internal surface of the cylinder head cover adjacent the aperture, and the cylinder head cover is removed from the cylinder head.

DETAILED DESCRIPTION

One embodiment of the invention will now be described with reference to the drawings, by way of example.

Figure 1:
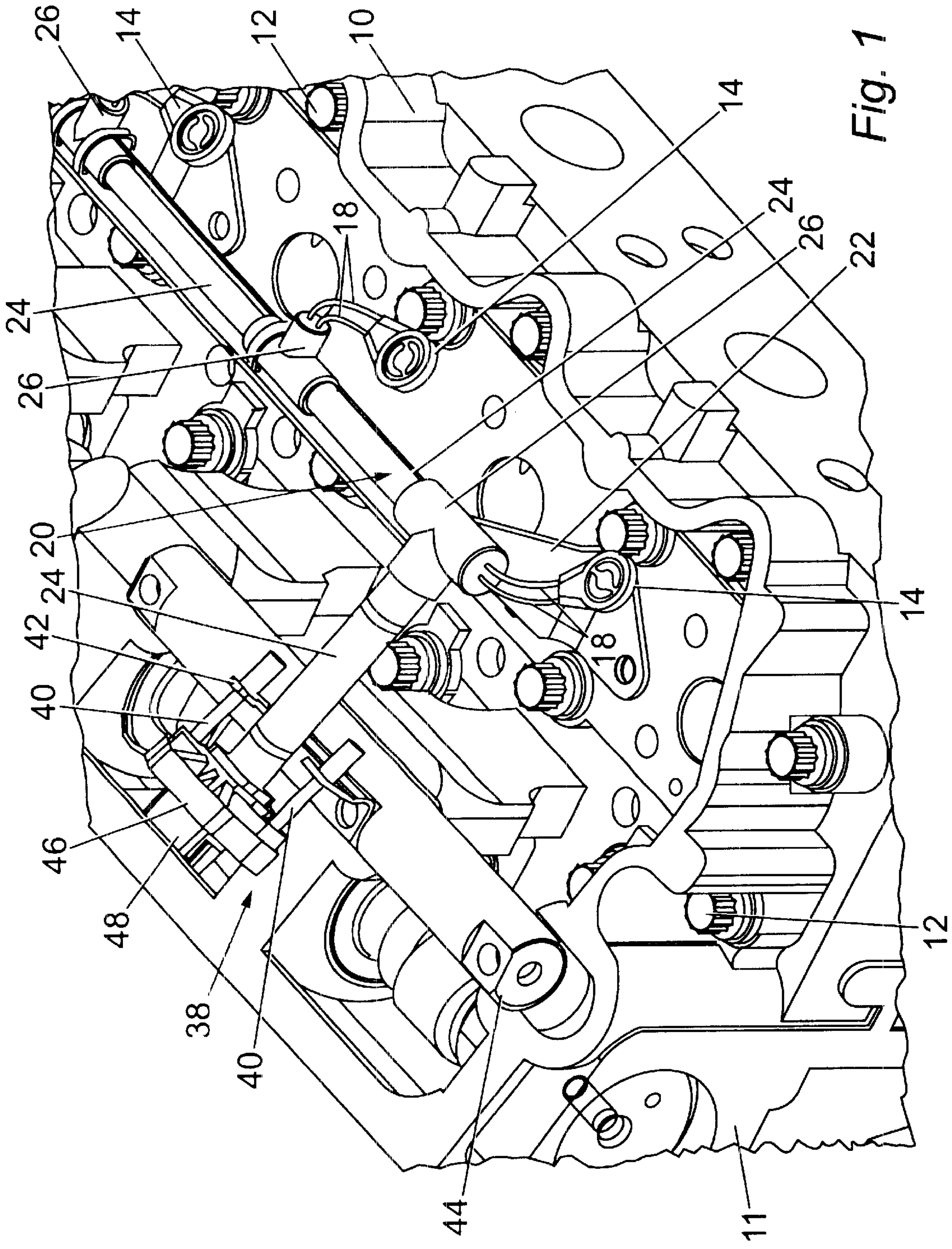
FIG. 1 is an isometric view of part of a cylinder head assembly forming one embodiment of the invention.

FIG. 1 shows part of a cylinder head 10 which is attached to a cylinder block 11 by fasteners 12. Fuel injectors (not shown) are electrically controlled via electrical wiring in the form of injector connectors 14 and leads 18 which are gathered into a wiring harness 20. The wiring harness 20 is mounted on a wiring harness support 22 secured to the cylinder head 10. The wiring harness 20 includes an outer covering formed by relatively flexible tubular sections 24 and relatively rigid angle sections 26.

Figure 2:
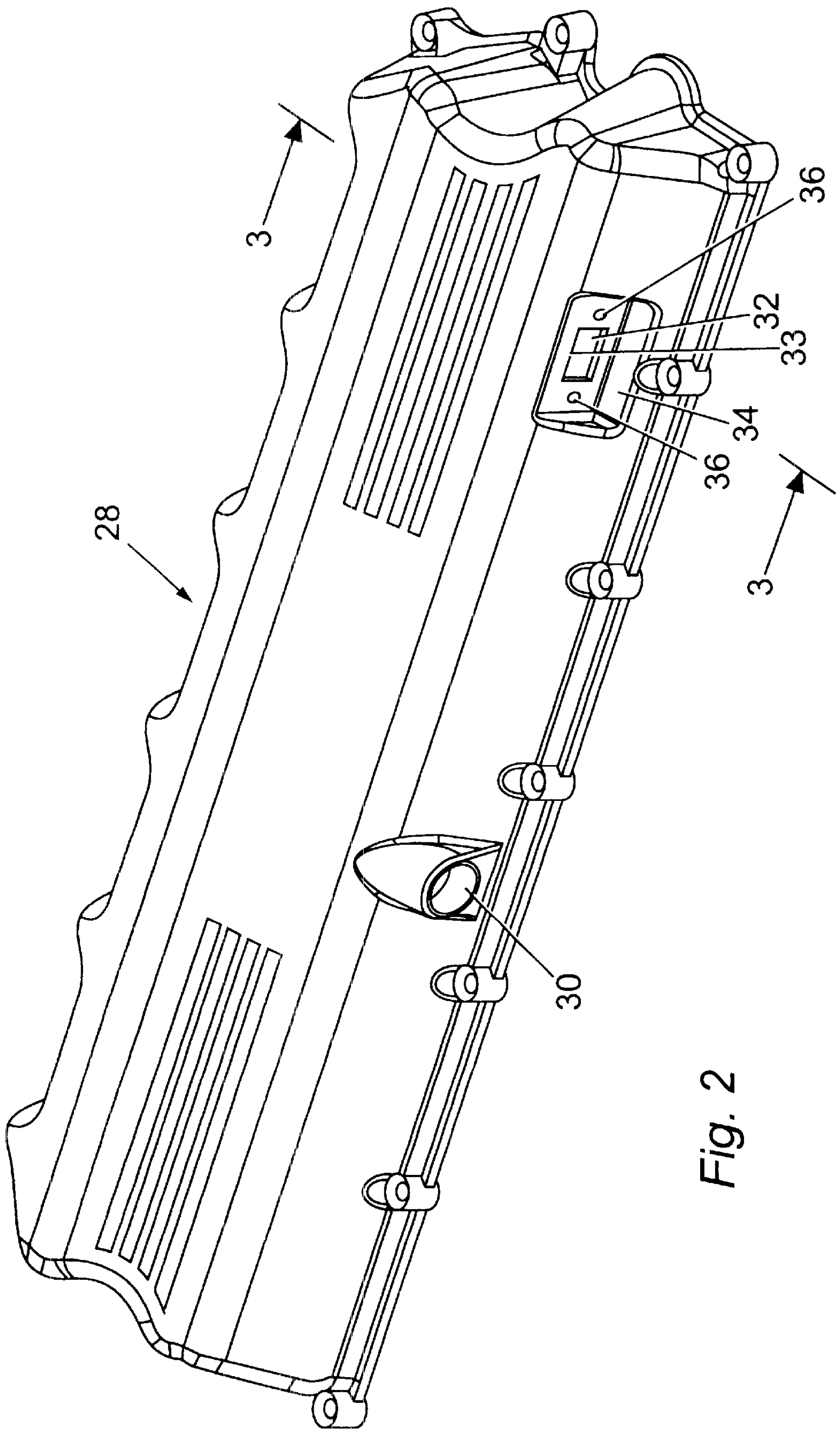
FIG. 2 is an isometric view of a cylinder head cover forming part of this embodiment.

Turning to FIG. 2, a cylinder head cover 28 is provided which is securable to the cylinder head 10 to form a closed space within which are disposed electrical devices in the form of the fuel injectors, and electrical wiring in the form of the leads 18 and wiring harness 20. Electrical devices (not shown) other than, or in addition to, electrically controlled fuel injectors may be located in said closed space and controlled via the electrical wiring; for example electrically controlled engine valve actuators or compression release retarders.

Figure 4:
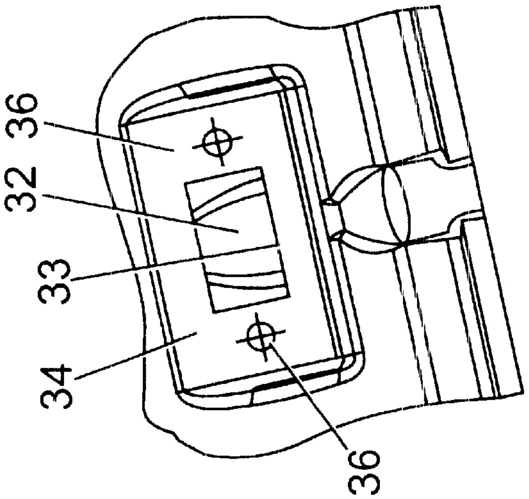
FIG. 4 is a fragmentary elevation in the direction of arrow 4 of FIG. 3.
Figure 3:
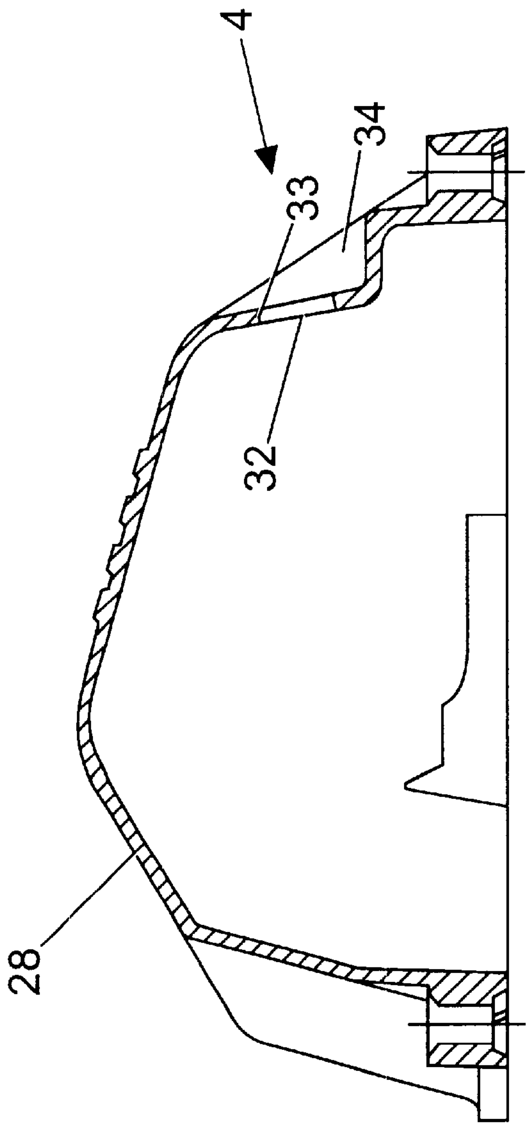
FIG. 3 is a cross-sectional view taken on the line 3—3 of FIG. 2.

The cylinder head cover 28 in this embodiment is a plastic moulding and includes a breather pipe connection 30 and an aperture 32. As also seen in FIGS. 3 and 4, the aperture 32 is disposed within a recessed portion 34 of the cylinder head cover 28, the recessed portion 34 also accommodating through-holes 36 on either side of the aperture 34. Since the aperture 32 is located within the recessed portion 34 in a location spaced away from the edge of the cylinder head cover 28, the aperture 32 has a closed periphery 33.

Reverting to FIG. 1, the wiring harness 20 terminates in a first connector 38. A connector mounting is formed by a plurality, in this example a pair, of rods 40 extending from the first connector 38 and a bracket 42 which is engaged by the rods 40, as will be described in more detail below. The bracket 42 is secured to a rocker shaft 44 fixed to the cylinder head 10. It is to be understood that the bracket 42 may instead be secured to any other component fixed to the cylinder head 10 or other fixed part of the engine.

Figures 5A, 5B, 5C:
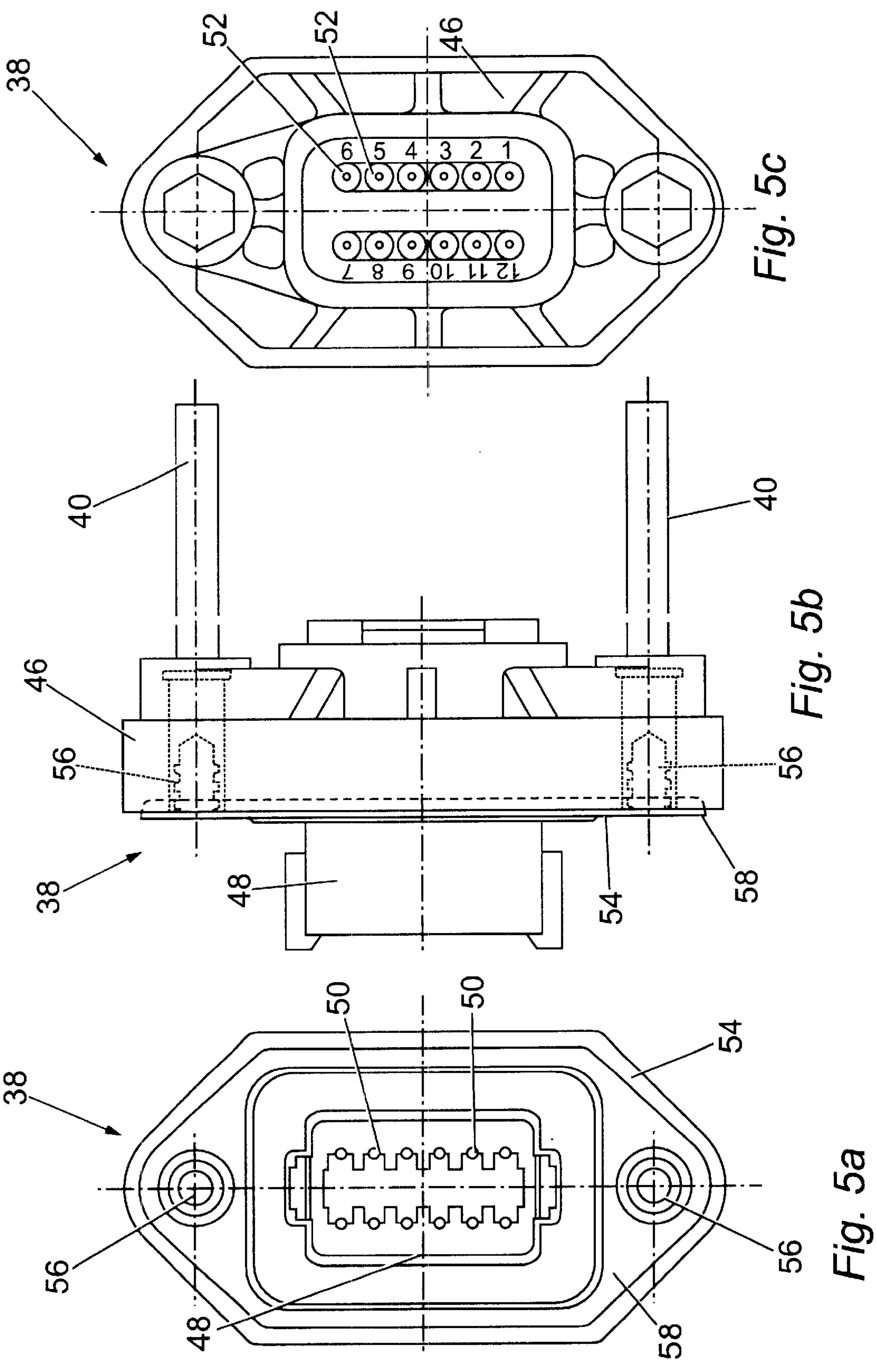
FIGS. 5A, 5B and 5C are respectively front, side and rear elevations of part of a connector used in this embodiment.

The first connector 38 is seen in greater detail in FIG. 5. The first connector 38 has a body portion 46. A connector block 48 projects forwardly from the body portion 46 and contains connector pins 50, each of which is electrically linked to a respective wire receptacle 52 accessible from the rear of the first connector 38.

In the illustrated embodiment the body portion 46 of the first connector 38 extends outwardly of the connector block 48 to provide a forward-facing flange surface 54. The flange surface 54 carries a gasket 58. A pair of screw-threaded metal inserts 56 in the body portion 46 are accessible through the flange surface 54 and the gasket 58. The rods 40 are secured in the body portion 46 and extend from its rear surface.

The first connector 38 shown is a modified version of a connector type DT04-12PA-LE10 by Deutsch Ltd of East Grinstead, Sussex, England, UK, but other forms of electrical connector may be used. The invention is not limited to the particular connector illustrated in the Figures and it is to be understood that the invention encompasses any electrical connector suitable for connecting to a second connector 60 linked to an electrical control circuit (not shown). The first and second connectors may be male and female or female and male components respectively of any known connector system, such as plug and socket connectors, pin connectors, barrel connectors, multipole connectors or terminal block connectors. The number of, and the voltage and current capacity of, paths through the connector will be determined by the electrical characteristics of the electrically controlled devices within the cylinder head cover 28.

It is possible to provide a gasket (not shown) between the second connector 60 and the outer surface of the cylinder head cover 28 in addition to, or instead of, the gasket 58.

The rods 40 on the first connector 38 engage in the bracket 42 which is angled such that the first connector 38 moves axially toward and away from the aperture 32. The engagement is arranged to have sufficient friction to hold the first connector 38 in the aperture 32 while screws 62 are engaged with the inserts 56 of the first connector 38 during connection of a second connector, described below.

Figure 7:
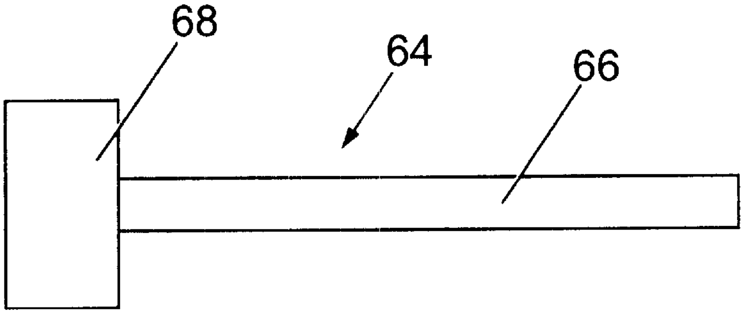
FIG. 7 is a side view of a tool for use with the embodiment of FIGS. 1 to 6.

The first connector 38 can most conveniently be manipulated with respect to the aperture 32 by means of a tool 64 as seen in FIG. 7. The tool 64 has an elongate handle 66 and a head 68. The head 68 is adapted to grip the first connector when pushed against it, for example by having sprung receptacles arranged to grip some or all of the connector pins 50, or by having sprung jaws or clips to engage the connector block 48. In a particular embodiment the head 68 may be a modified version of a second connector 60 designed to function as a co-connector with the first connector 38, for example the corresponding female connector if the first connector 38 is a male connector.

INDUSTRIAL APPLICABILITY

Figure 6:
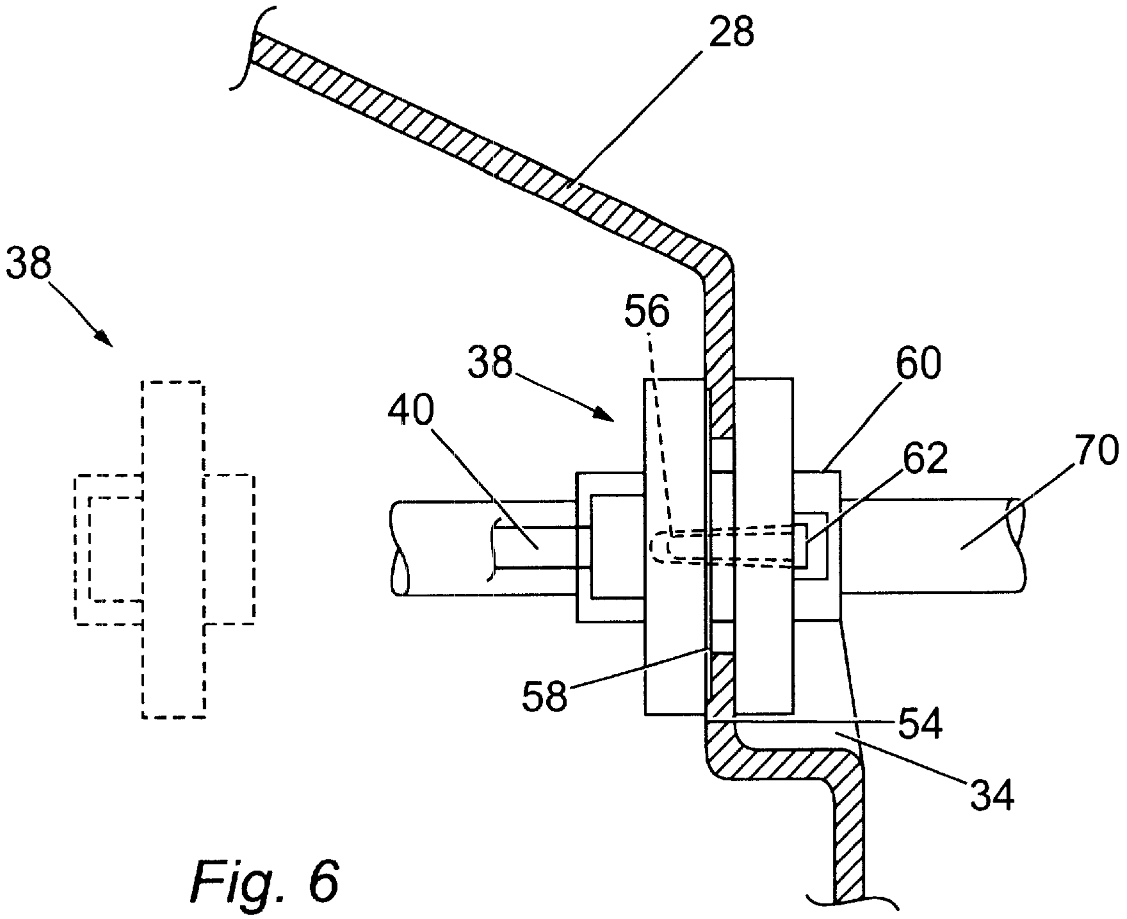
FIG. 6 is a partial cross-sectional view taken in the same direction as FIG. 3 but showing first and second connectors in position.

As will most readily be understood by reference to FIG. 6, once the cylinder head cover 28 is in position on the cylinder head 10, the first connector 38 can be moved from an initial position indicated in broken lines until the flange surface 54 is engaged with the internal surface of the cylinder head cover 28 with the gasket 58 therebetween. The tool 64 can be used to pull the first connector 38 into the aperture 32 and against the cylinder head cover 28, at which point further tension will remove the tool 64 from the first connector 32.

A mating second connector 60 electrically coupled by wiring 70 to an electrical control circuit (not shown) is applied from the exterior to the aperture 32. Threaded fasteners in the form of screws 62 are inserted through the through-holes 36 into the metal inserts 56 and fastened to draw the first and second connectors firmly together to effect both electrical connection and closure of the aperture 32.

When it is desired to gain access to the cylinder head 11, the screws 62 are removed from the metal inserts 56 and through-holes 36, the second connector 60 is removed, the first connector 32 is pushed inwardly on the rods 40 where the bracket 42 prevents it becoming disengaged from the rods 40, and the cylinder head cover 28 is removed.

Thus, the invention makes it possible for a cylinder head cover 28 through which wiring passes to be affixed and removed in a simple and rapid manner, and to achieve a fluid-tight enclosure.

The invention can be used in diesel engines having electrically controlled fuel injection, and also in internal combustion engines in general having electrically controlled cylinder head devices.

Although the presently preferred embodiments of this invention have been described, those skilled in the art will recognize that various modifications may be made without departing from the scope of the appended claims.

What is claimed is:

1. A cylinder head cover assembly for use with an internal combustion engine, the assembly comprising:

a cylinder head cover positionable on a cylinder head to define a closed space;

a first connector;

electrical wiring extending from the first connector and having at least one distal end connectable, in use of the engine, to at least one electrical device disposed within said closed space;

the cylinder head cover defining an aperture therethrough with a closed periphery;

the first connector being movable after the cylinder head is positioned to define the closed space to be received in the aperture and removably seated against an internal surface of the cylinder head cover adjacent said closed periphery.

2. An assembly according to claim 1, including a second connector insertable into said aperture from the exterior of the cylinder head cover to engage and electrically couple with said first connector.

3. An assembly according to claim 2, including at least one gasket located between the cylinder head cover and at least one of the first and second connectors.

4. An assembly according to claim 1, including at least one fuel injector connected to said at least one distal end of the wiring.

5. An assembly according to claim 1 wherein said first connector is removable from its seated position while the cylinder head cover is positioned to define the closed space.

6. An internal combustion engine comprising:

a cylinder block;

a cylinder head; and a cylinder head cover assembly according to claim 1.

7. A cylinder head cover assembly for use with an internal combustion engine, the assembly comprising:

a cylinder head cover attachable to a cylinder head to define a closed space;

a first connector;

electrical wiring extending from the first connector and having at least one distal end connectable, in use of the engine, to at least one electrical device disposed within said closed space;

the cylinder head cover defining an aperture therethrough with a closed periphery, in which aperture said first connector is receivable to be removably seated against an internal surface of the cylinder head cover adjacent said closed periphery; and a second connector insertable into said aperture from the exterior of the cylinder head cover to engage and electrically couple with said first connector, the second connector when inserted being seated against the external surface of the cylinder head cover adjacent said closed periphery.

8. An assembly according to claim 7, including at least one gasket located between the cylinder head cover and at least one of the first and second connectors.

9. An assembly according to claim 7, including a connector mounting which carries the first connector for movement towards and away from said aperture.

10. An assembly according to claim 9, wherein the connector mounting includes a bracket fixed with respect to the cylinder head, and a pair of rods extending from the first connector and frictionally engaged with the bracket.

11. An assembly according to claim 7, including at least one threaded fastener adapted to extend through the cylinder head cover and to secure together the first and second connectors.

12. A cylinder head cover assembly for use with an internal combustion engine, the assembly comprising:

a cylinder head cover attachable to a cylinder head to define a closed space;

a first connector;

electrical wiring extending from the first connector and having at least one distal end connectable, in use of the engine, to at least one electrical device disposed within said closed space;

the cylinder head cover defining an aperture therethrough with a closed periphery, in which aperture said first connector is receivable to be removably seated against an internal surface of the cylinder head cover adjacent said closed periphery; and a connector mounting which carries the first connector for movement towards and away from said aperture.

13. An assembly according to claim 12, wherein the connector mounting includes a bracket fixed with respect to the cylinder head, and a pair of rods extending from the first connector and frictionally engaged with the bracket.

14. A cylinder head cover assembly for use with an internal combustion engine, the assembly comprising:

a cylinder head cover attachable to a cylinder head to define a closed space;

a first connector;

electrical wiring extending from the first connector and having at least one distal end connectable, in use of the engine, to at least one electrical device disposed within said closed space;

the cylinder head cover defining an aperture therethrough with a closed periphery, in which aperture said first connector is receivable to be removably seated against an internal surface of the cylinder head cover adjacent said closed periphery;

a second connector insertable into said aperture from the exterior of the cylinder head cover to engage and electrically couple with said first connector; and a connector mounting which carries the first connector for movement towards and away from said aperture.

15. An assembly according to claim 14, wherein the connector mounting includes a bracket fixed with respect to the cylinder head, and a pair of rods extending from the first connector and frictionally engaged with the bracket.

16. A cylinder head cover assembly for use with an internal combustion engine, the assembly comprising:

a cylinder head cover attachable to a cylinder head to define a closed space;

a first connector;

electrical wiring extending from the first connector and having at least one distal end connectable, in use of the engine, to at least one electrical device disposed within said closed space;

the cylinder head cover defining an aperture therethrough with a closed periphery, in which aperture said first connector is receivable to be removably seated against an internal surface of the cylinder head cover adjacent said closed periphery;

a second connector insertable into said aperture from the exterior of the cylinder head cover to engage and electrically couple with said first connector; and at least one threaded fastener adapted to extend through the cylinder head cover and to secure together the first and second connectors.

17. In a method of connecting at least one electrical device disposed within a cylinder head cover to a location external to the cylinder head cover, the steps of:

attaching to the electrical device electrical wiring which is coupled to a first connector;

positioning the cylinder head cover on a cylinder to head to define a closed space; and thereafter engaging the first connector against an aperture provided in the cylinder head cover with the first connector removably seated against an internal surface of the cylinder head cover adjacent the aperture.

18. A method according to claim 17 further comprising the step of:

inserting a second connector into the aperture from the exterior of the cylinder head cover to engage and electrically couple with the first connector.

19. A method according to claim 17 wherein said engaging step includes:

passing a head of a tool through the aperture;

engaging the first connector with the head of the tool with sufficient retaining force to permit the first connector to be pulled by the tool against the friction between connector mounting bracket and a guide member extending from the first connection; and pulling the first connector toward the aperture with the tool.

20. A method according to claim 17 wherein said first connector is removable from its seated position while the cylinder head cover is positioned to define the closed space.

21. A method of removing a cylinder head cover from a cylinder head, in which cylinder head cover there is disposed at least one electrical device attached to electrical wiring, the wiring being coupled to a first connector, the method comprising the steps of:

disengaging and removing a second connector from the first connector through an aperture provided in the cylinder head cover, thereby electrically decoupling the first and second connectors;

causing the first connector to move away from an internal surface of the cylinder head cover adjacent the aperture; and thereafter removing the cylinder head cover from the cylinder head.

* * * * *